United States Patent
Masterton et al.

(10) Patent No.: US 7,458,516 B2
(45) Date of Patent: Dec. 2, 2008

(54) CARD READER

(75) Inventors: Stuart Masterton, Newtyle (GB); Barrie Clark, Life Village (GB)

(73) Assignee: NCR Corporation, Dayton, OH (US)

( * ) Notice: Subject to any disclaimer, the term of this patent is extended or adjusted under 35 U.S.C. 154(b) by 374 days.

(21) Appl. No.: 11/273,485

(22) Filed: Nov. 14, 2005

(65) Prior Publication Data
US 2007/0108278 A1 May 17, 2007

(51) Int. Cl.
*G06K 7/00* (2006.01)
(52) U.S. Cl. .................. 235/486; 235/453; 235/479
(58) Field of Classification Search .................. 235/486, 235/449, 453, 479, 480
See application file for complete search history.

(56) References Cited

U.S. PATENT DOCUMENTS

| | | | |
|---|---|---|---|
| 6,820,806 B2 * | 11/2004 | Nagata et al. | 235/439 |
| 6,981,647 B2 * | 1/2006 | Hirasawa | 235/486 |
| 7,151,451 B2 * | 12/2006 | Meskens et al. | 340/552 |
| 2002/0043562 A1 * | 4/2002 | Zazzu et al. | 235/457 |
| 2004/0035929 A1 * | 2/2004 | Okada | 235/438 |
| 2004/0262390 A1 * | 12/2004 | Orii | 235/449 |
| 2005/0116036 A1 * | 6/2005 | Akahane et al. | 235/449 |
| 2006/0118624 A1 * | 6/2006 | Kelso et al. | 235/444 |
| 2006/0243790 A1 * | 11/2006 | Ramachandran et al. | 235/379 |

* cited by examiner

*Primary Examiner*—Ahshik Kim
(74) *Attorney, Agent, or Firm*—Michael Chan

(57) ABSTRACT

A card reader comprises an entry slot to allow access for a card into the interior of the card reader along a predetermined passage. The card reader further comprises a controller and an image capture device arranged so as to monitor the interior of the card reader.

20 Claims, 2 Drawing Sheets

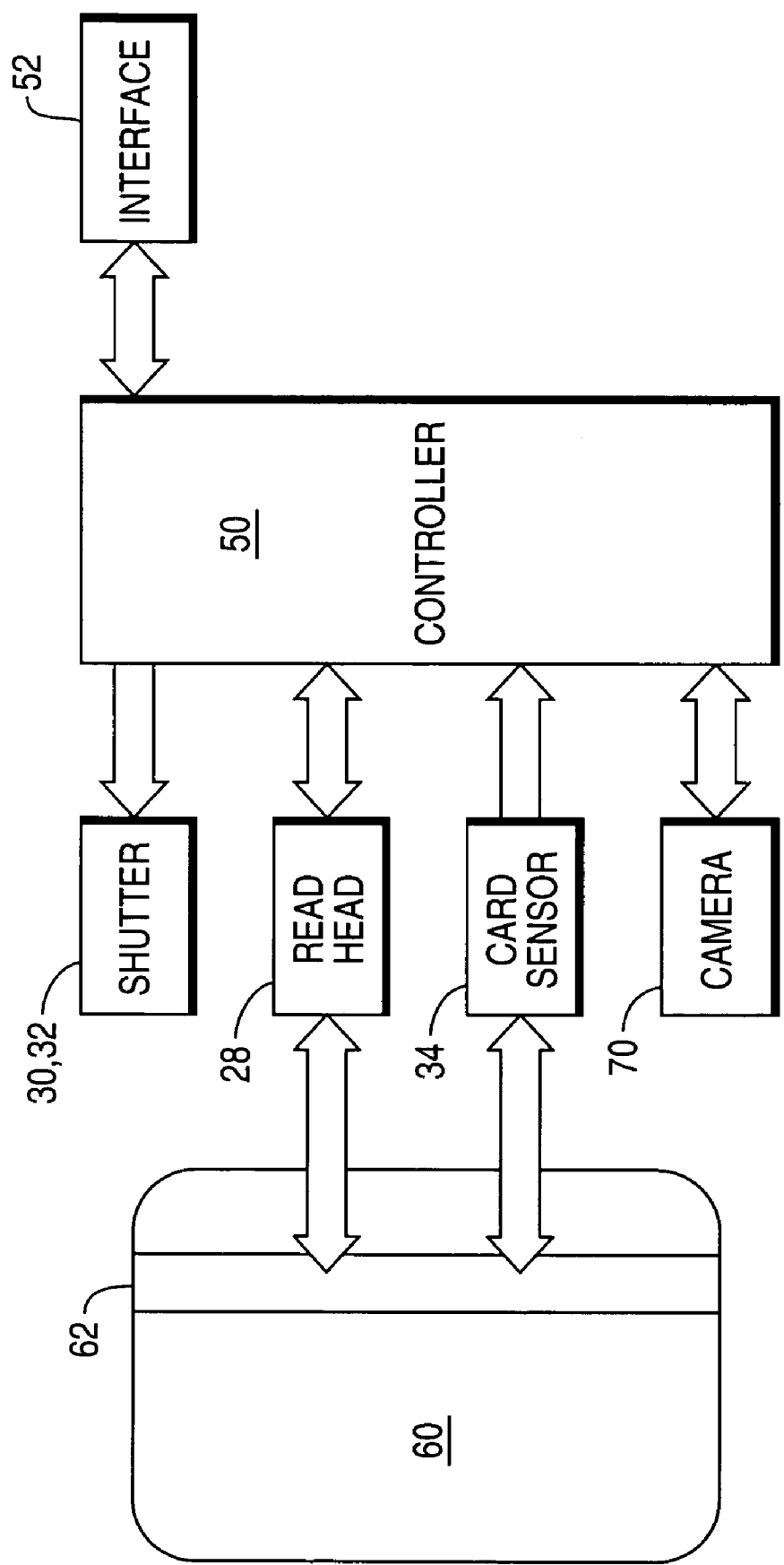

CARD READER

The present invention relates to a card reader, and particularly to an apparatus and method for detecting an attempted unauthorized interference with a card within the card reader.

BACKGROUND

A card reader can normally read either a magnetic stripe card or a smart card (also referred to as an integrated circuit card). There are some integrated card readers which can read both magnetic stripe and smart card, which are known as hybrid card readers. To read a magnetic stripe, the stripe must move relative to a magnetic read head; however, to read a smart card having conducting terminals, the card terminals must align, make contact, and remain in contact with terminals used for reading the smart card.

The present invention can be utilized with any type of card reader although it is most appropriate for an automatic card reader as opposed to a dip card reader.

Card readers are used in apparatus, such as an automated teller machine (ATM), where a user may insert a magnetic stripe card, a smart card, or a combined magnetic stripe and smart card to conduct a transaction.

One disadvantage of card readers is the increasing prevalence of attempted fraud associated with card readers, especially ATM card readers.

The entrance to a card reader is particularly vulnerable, for example, to the insertion of certain devices intended for the fraudulent capture of an authorized user's card or the information thereon. There exists at present several known methods by which a customer or user's card details can be obtained by fraud, for example, the introduction of Lebanese or Marseille Loops into the card reader. Also information can be obtained indirectly by the introduction of an Algerian V into the card reader or directly by the attachment of a skimming device at the entrance to the card reader.

SUMMARY

It is among the objects of an embodiment of the present invention to obviate or mitigate one or more of the above disadvantages or other disadvantages associated with card readers.

According to a first aspect of the present invention there is provided a card reader comprising an entry slot to allow access for a card into the interior of the card reader along a predetermined passage, and a card reader controller, characterized by an image capture device arranged so as to monitor the interior of the card reader.

According to a second aspect of the invention there is provided a self-service terminal (SST) incorporating a card reader according to the first aspect of the invention.

According to a third aspect of the present invention there is provided a method of operation of a card reader according to the first aspect of this invention, the method comprising the step of periodically imaging the interior of the card reader.

Preferably, the method includes the step of imaging the position of a card guide-plate or drive rollers.

Preferably, the method includes the step of periodically opening the shutter in order to image the immediate exterior of the card reader from within the reader.

Alternatively, the method includes the steps of imaging the surface of an inserted card and determining from the topography of the card, whether or not a filament is wrapped around the card.

The SST may be an automated teller machine (ATM). Alternatively, the SST may be a retail point of sale (PoS) terminal.

BRIEF DESCRIPTION OF THE DRAWINGS

These and other aspects of the invention will be apparent from the following specific description, given by way of example, with reference to the accompanying drawings, in which:

FIG. 4 is a block diagram of the card reader of FIG. 1 interfacing with a card.

DETAILED DESCRIPTION

Figure 1:
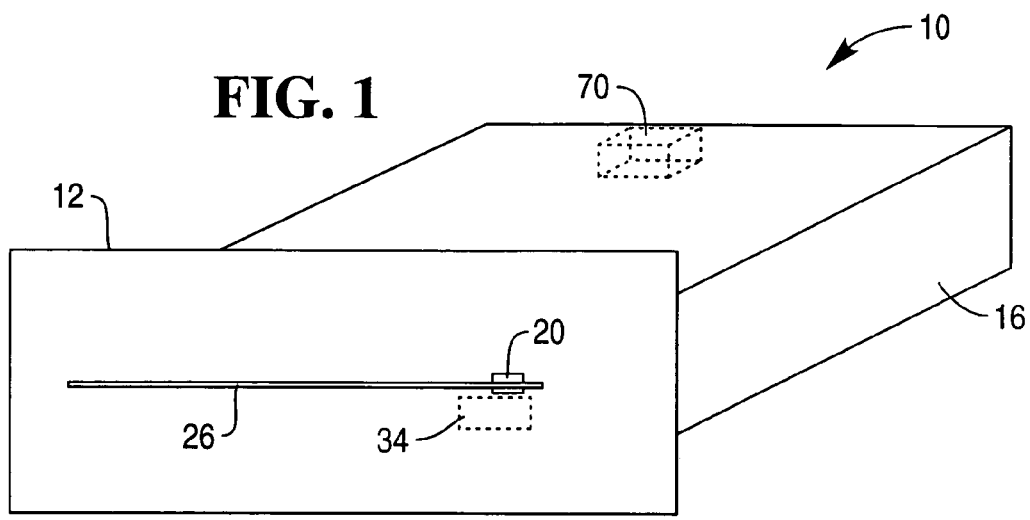
FIG. 1 is a schematic perspective view of a card reader according to one embodiment of the invention.
Figure 2:
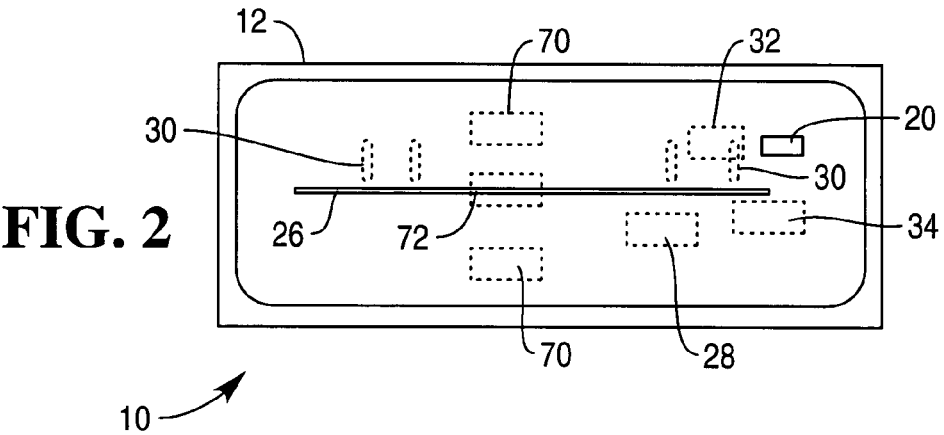
FIG. 2 is a schematic front view of the card reader of FIG. 1.
Figure 3:
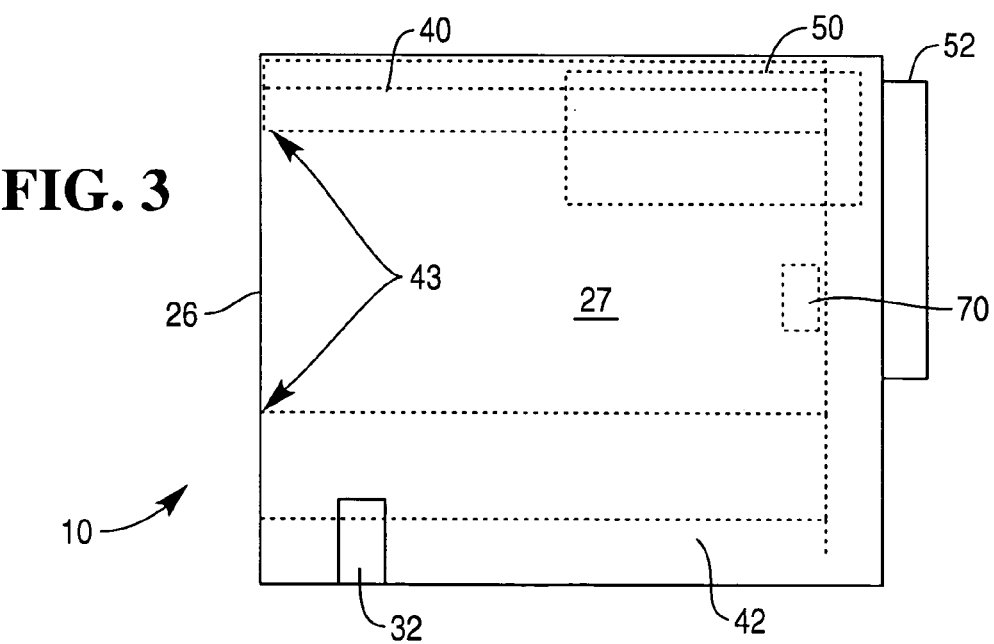
FIG. 3 is a schematic plan view of the card reader of FIG. 1.

Reference is now made to FIGS. 1 to 3, which show a card reader 10 according to one embodiment of the present invention. The card reader 10 has a bezel 12 which includes a transparent cover 20 that aligns with an LED (not shown) in the bezel 12.

The bezel 12 has a card entry slot 26 arranged to pass an inserted card into a card chamber 27 in the card reader housing portion 16.

The card reader 10 further comprises a magnetic read head 28 for reading a magnetic stripe on a card; a pin or portcullis style shutter 30 for locking a card within the reader 10 and preventing a tool from being used to open the shutter; a solenoid 32 for activating the shutter 30; and a card sensor 34 for sensing the presence of a card.

The housing portion 16 incorporates a controller 50, as illustrated in FIG. 4, for controlling the operation of the card reader 10. The controller 50 is coupled to a communications interface 52, in addition to being coupled to the shutter mechanism (including the pin shutter 30 and solenoid 32), the magnetic read head 28, the smart card interface 42, and the card sensor 34.

FIG. 4 also illustrates a hybrid card 60 having a magnetic stripe 62.

Throughout this specification and claims the term foreign object or foreign body is intended to include, but not be limited to: dental floss, wire, VCR tape, fishing line and adhesive tape.

In accordance with the present invention the entrance to the card slot 26 can be monitored internally by using an 'Image Capture Device' (ICD), in the form of a miniature camera 70, arranged to view the full width of the card entrance slot 26. This arrangement enables the immediate detection of interference with the reader, and allows system software, within the controller 50 to immediately (within a few clock-cycles) recognize the fact that an unauthorized action is occurring, and to take whatever action is deemed necessary to ensure the protection of customer details. In particular the controller 50 can arrange to close the pin shutter 30.

In addition, the ICD system is arranged to immediately detect any inappropriate movement of the card guide-plates 40, 42. Detecting any movement of the guide-plates 40, 42 and/or guide rollers (not shown) will also assist the controller 50 in identifying the presence of a foreign object within the card reader 10.

Alternatively a foreign object can be detected directly by analyzing the view through the card travel area or chamber 27.

In addition the card reader shutter 30 can be opened periodically in order to ascertain whether external interference has occurred.

A further benefit of the system is that due to the high resolution of the ICD, any embossing on the surface of the card 60 can be detected. In this way the system can identify whether a genuine card 60 has been introduced. As it is common practice for fraudsters to use 'blank stock', the system can identify a potential fraudulent action and allow the card 60 to be retained by the reader 10, by the closure of the shutter 30.

In a method of processing in accordance with the present invention the captured image (either real-time or snapshot) will be transferred to a binary file, and the post-processing includes taking a 'pixel-count' relating to the area of interest. A software algorithm is utilized in order to compare the captured image with pre-defined 'good-state' parameters.

The ICD device, in the form of a camera 70, is positioned such that it facilitates the image capture of the entire width of the card throat 43. This can be achieved by situating the camera 70 at the extreme rear of the card reader chamber 27. Clearly, in order to allow for complete and full functionality of the card reader 10, it is necessary to mount the camera 70 such as to allow for the passage of an inserted card 60. Alternatively, the image capture device 70 is positioned above or below the passageway 27 and an image of the entry slot 26 is achievable using an optical device 72, such as a mirror or prism, in the passageway 27.

It has been determined that in order for this invention to function well that the image must be taken from less than 5 degrees (and preferably less than 2 degrees) from the plane containing the card in order to detect a filament.

Various modifications may be made to the above described embodiment within the scope of the invention, for example, it will be appreciated that the card reader may be a card reader and writer.

What is claimed is:

1. A card reader comprising an entry slot to allow access for a card into the interior of the card reader along a predetermined passage, and a card reader controller, characterized by an image capture device arranged so as to monitor the interior of the card reader and to confirm that the predetermined passage is clear of foreign bodies, wherein the image capture device is arranged to capture images of the interior at less than 5 degrees from the plane containing travel path of a card.

2. A card reader as claimed in clam 1, wherein the angle is less than 2 degrees.

3. A card reader as claimed in claim 1, wherein the image capture device is arranged to confirm that the entry slot is clear of foreign bodies, on the opening of a shutter.

4. A card reader as claimed in claim 1, further including a shutter arranged to lock an inserted card within the card reader, when the controller determines, after analysis of captured image, that a foreign body is present.

5. A card reader as claimed in claim 4, wherein the image capture device is arranged to confirm that the shutter is in the expected position, at one or more points throughout a transaction process, when in use.

6. A card reader as claimed in claim 1, wherein the image capture device is arranged to provide an image of the predetermined passageway prior to the insertion of a card and of the surface of the card after insertion thereof into the card reader.

7. A card reader as claimed in claim 1, wherein the image capture device is arranged to repeatedly image the interior of the card reader device and provide a near real-time signal if any foreign body other than an authentic user's card is imaged within the card reader.

8. A card reader as claimed in claim 1, further including card guide plates, wherein the image capture device images the card guide plates.

9. A card reader as claimed in claim 1, wherein the image capture device includes a camera.

10. A card reader as claimed in claim 1, further including control means which in turn includes pixel count means.

11. A card reader as claimed in claim 1, wherein the image capture device is positioned towards the rear of the predetermined passage.

12. A card reader comprising an entry slot to allow access for a card into the interior of the card reader along a predetermined passage, and a card reader controller, characterized by an image capture device arranged so as to monitor the interior of the card reader and to confirm that the predetermined passage is clear of foreign bodies, wherein the image capture device is positioned above or below the predetermined passage and an image of the entry slot is achievable using an optical device which is retractably movable into the predetermined passage.

13. A card reader as claimed in claim 12, wherein the optical device includes a mirror or a prism.

14. A method of operating a card reader having an entry slot through which a card can be inserted into the interior of the card reader, the method comprising:

imaging a surface of an inserted card to provide a first captured image which is representative of topography of the card; and analyzing the first captured image to determine whether or not a filament is wrapped around the card.

15. A method as claimed in claim 14, further comprising:

imaging a card guide-plate or drive roller to provide a second captured image which is representative of position of the card guide-plate or drive roller; and analyzing the second captured image to determine whether or not a foreign object which is other than the inserted card has been inserted into the interior of the card reader.

16. A method as claimed in claim 14, further comprising:

periodically opening a shutter of the card reader;

imaging the immediate exterior of the card reader from within the reader to provide a second captured image which is representative of the immediate exterior of the card reader from within the reader when the shutter is open;

analyzing the second captured image to determine whether or not a foreign object which is other than the inserted card is about to be inserted through the entry slot into the interior of the card reader.

17. A method according to claim 14, wherein analyzing the first captured image includes:

transferring the first captured image to a binary file;

analyzing an area of interest of the binary file to provide a pixel-count which is associated with a corresponding area of interest of the first captured image; and comparing the pixel-count with a predefined pixel-count to determine whether or not a filament is wrapped around the card.

18. A method of operating a card reader having a shutter which covers an entry slot through which a card can be inserted into an interior chamber of the card reader, the method comprising:

periodically opening the shutter before a card is inserted through the entry slot;

imaging at least a portion of the interior chamber of the card reader in response to the shutter periodically opening to provide a first captured image; and analyzing the first captured image to determine whether or not a foreign object has been inserted through the entry slot into the interior chamber of the card reader.

19. A method according to claim 18, wherein imaging at least a portion of the interior chamber includes imaging at least a portion of the entry slot.

20. A card reader comprising:

a number of surfaces defining an entry slot through which a card can be inserted into an interior chamber along a predetermined passageway;

a camera arranged to capture an image which is representative of a least a portion of the predetermined passageway; and a controller arranged to analyze the captured image to determine if a foreign object which is other than a card has been inserted into the interior chamber along the predetermined passageway.

* * * * *

UNITED STATES PATENT AND TRADEMARK OFFICE
CERTIFICATE OF CORRECTION

PATENT NO. : 7,458,516 B2  Page 1 of 1
APPLICATION NO. : 11/273485
DATED : December 2, 2008
INVENTOR(S) : Stuart Masterton et al.

It is certified that error appears in the above-identified patent and that said Letters Patent is hereby corrected as shown below:

Column 3, line 49, after "in" delete "clam" and insert --claim--.

Signed and Sealed this

Twenty-third Day of March, 2010

David J. Kappos
*Director of the United States Patent and Trademark Office*